United States Patent
Runkle et al.

(10) Patent No.: US 6,741,485 B1
(45) Date of Patent: May 25, 2004

(54) INTERCONNECTION SYSTEM FOR TRANSMITTING POWER BETWEEN ELECTRICAL SYSTEMS

(75) Inventors: Mark A. Runkle, Schenectady, NY (US); Einar V. Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/828,502

(22) Filed: Mar. 31, 1997

Related U.S. Application Data

(63) Continuation of application No. 08/550,941, filed on Oct. 31, 1995, now abandoned, which is a continuation-in-part of application No. 08/426,201, filed on Apr. 21, 1995, now abandoned.

(51) Int. Cl.$^7$ ................................................ H02M 5/06
(52) U.S. Cl. ...................................... 363/170; 323/348
(58) Field of Search ................................ 363/170, 171, 363/174, 175; 323/201, 348; 307/47, 67, 68; 318/150, 158, 700, 723

(56) References Cited

U.S. PATENT DOCUMENTS

| | | | |
|---|---|---|---|
| 3,118,318 A | * | 1/1964 | Rauhut et al. .................. 475/4 |
| 3,471,708 A | | 10/1969 | Rauhut et al. |
| 3,472,708 A | * | 10/1969 | Rauhut et al. .............. 148/108 |
| 3,694,723 A | | 9/1972 | Kanngiesser et al. |

(List continued on next page.)

FOREIGN PATENT DOCUMENTS

| | | |
|---|---|---|
| CA | 2 170 686 A | 10/1996 |
| DE | 1 488 773 | 4/1969 |
| DE | 34 43 428 A | 6/1985 |
| GB | 1157885 | 7/1969 |
| GB | 2 055 515 A | 3/1981 |

OTHER PUBLICATIONS

In Goto et al., "Power System Stabilizing Control By Adjustable Speed Pumped Storage Power Station Using Stabilizing Signals", CIGRE Symposium Tokyo 1995.

See Puchstein, Llody, and Conrad, *Alternating–Current Machines*, 3rd Edition, John Wiley & Sons, Inc., New York, pp. 425–428, particularly Fig. 275 on p. 428, 1954.

Kron, *Equivalent Circuits of Electric Machinery*, John Wiley & Sons, Inc., New York, pp. 150–163, particularly Fig. 9.5a on p. 156, 1951.

Larsen, Einar V., et al, "Specification of AC Filters For HVDC Systems" 1989.

(List continued on next page.)

*Primary Examiner*—Adolf Berhane
(74) *Attorney, Agent, or Firm*—Nixon & Vanderhye, P.C.

(57) ABSTRACT

An electrical interconnection system (100) comprises a variable frequency rotary transformer (102) and a control system (104). The control system (104) adjusts an angular position of the rotary transformer (102) so that measured power ($P_1$) transferred from a first electrical system (22) to a second electrical system (24) matches an inputted order power ($P_0$). The rotary transformer (102) comprises a rotor assembly (110) and a stator (112), with the control system (104) adjusting a time integral of rotor speed over time. The control system (104) includes a first control unit (107) and a second control unit (108). The first control unit (107) compares the input order power $P_0$ to the measured power $P_1$ to generate a requested angular velocity signal $\omega_0$. The second control unit (108) compares the requested angular velocity signal $\omega_0$ to a measured angular velocity signal $\omega_r$ of the rotary transformer to generate a converter drive signal $T_0$ to a torque control unit (106), thereby controlling the angular positioning ($\theta_r$) of the rotor assembly (110) relative to the stator (112). In various embodiments, the torque control unit (106) is integrated in the rotor assembly (110) and stator (112) of the rotary transformer (102).

15 Claims, 13 Drawing Sheets

U.S. PATENT DOCUMENTS

| | | | |
|---|---|---|---|
| 3,701,938 A | | 10/1972 | Chadwick |
| 3,836,837 A | | 9/1974 | Rauhut |
| 4,019,115 A | | 4/1977 | Lips |
| 4,179,729 A | * | 12/1979 | Stanton et al. ............... 363/175 |
| 4,238,822 A | | 12/1980 | Schade |
| 4,249,237 A | | 2/1981 | Ronk et al. |
| 4,251,736 A | | 2/1981 | Coleman |
| 4,445,049 A | | 4/1984 | Steigerwald |
| 4,489,261 A | * | 12/1984 | Hartwig et al. ............. 318/700 |
| 4,503,377 A | | 3/1985 | Kitabayashi et al. ........ 318/807 |
| 4,517,471 A | * | 5/1985 | Sachs ........................... 307/67 |
| 4,694,189 A | | 9/1987 | Haraguchi et al. |
| 4,748,827 A | | 6/1988 | Chang ........................ 318/798 |
| 4,804,900 A | * | 2/1989 | Soeda ........................ 318/719 |
| 4,870,558 A | | 9/1989 | Luce |
| 4,922,124 A | | 5/1990 | Seki et al. |
| 4,941,079 A | | 7/1990 | Ooi |
| 4,992,721 A | | 2/1991 | Latos |
| 5,111,377 A | * | 5/1992 | Higasa et al. ................. 363/95 |
| 5,239,251 A | | 8/1993 | Lauw |
| 5,341,280 A | | 8/1994 | Divan et al. |
| 5,550,457 A | | 8/1996 | Kusase et al. |
| 5,608,615 A | | 3/1997 | Luce |

OTHER PUBLICATIONS

"Rotary Converters", Westinghouse Electric & Manufacturing Company, Circular No. 1028, Apr. 1903.

"Inductrol Voltage Regulators", General Electric Company, Publication 607C, pp. 29–30, Jun. 10, 1974.

Enrique Lopez P., et al "Control and Planning of 50/60 Hz Industrial System Load Flows", Aug. 1990, Proceedings of the Colloquium in S. America, Argentina, Brazil, Chile, Uruguay, pp. 162–167.

* cited by examiner

INTERCONNECTION SYSTEM FOR TRANSMITTING POWER BETWEEN ELECTRICAL SYSTEMS

This application is a continuation of U.S. patent application Ser. No. 08/550,941 Oct. 31, 1995, now abandoned by Mark A. Runkle and entitled "INTERCONNECTION SYSTEM FOR TRANSMITTING POWER BETWEEN ELECTRICAL SYSTEMS", which in turn is a continuation-in-part of U.S. patent application Ser. No. 08/426,201 filed Apr. 21, 1995 now abandoned by Mark A. Runkle and entitled "INTERCONNECTION SYSTEM FOR ELECTRICAL SYSTEMS HAVING DIFFERING ELECTRICAL CHARACTERISTIC" (abandoned), and is related to U.S. patent application Ser. No. 08/550,940 entitled "ASYNCHRONOUS CONVERSION METHOD AND APPARATUS FOR USE WITH VARIABLE SPEED TURBINE HYDROELECTRIC GENERATION", all of which are incorporated herein by reference.

BACKGROUND

1. Field Of Invention

This invention pertains to control of electrical power transmission, and particularly to transmission of power between electrical systems.

2. Related Art and Other Considerations

Some electrical transformers, for example tap-changing transformers such as variacs, merely vary voltage. Other transformers, known as stationary phase shifting transformers, can divert power and move power through a torque angle.

Mere voltage-varying transformers and stationary phase shifting transformers may be adequate for interconnecting two electrical systems operating at the same electrical frequency, or for transmission within a utility company. However, such transformers are incapable of interfacing two electrical systems operating a differing frequency (e.g, inter-utility transfers of electricity).

There exist a number of areas in the world where interconnections between power systems require an asynchronous link. For some of these areas the power systems have different nominal frequencies (e.g , 60 Hz and 50 Hz). Even for interconnections in other systems having the same nominal frequency, there is no practical means of establishing a synchronous link having enough strength to permit stable operation in an interconnected mode.

The prevailing technology for accomplishing an asynchronous interconnection between power systems is high voltage direct current (HVDC) conversion.

FIG. 8 is a one-line diagram schematically illustrating a prior art HVDC interconnection system 820. FIG. 8 shows interconnection system 820 connecting a first or supply system 822 (shown as AC Power System #1) and a second or receiver system 824 (shown as AC Power System #2). AC Power System #1 is connected to interconnection system 820 by lines 826 for supplying, in the illustrated example, a three-phase input signal of frequency F1 (F1 being the frequency of supply system 822). Interconnection system 820 is connected by lines 828 to receiver system 824, with lines 828 carrying a three-phase output signal of frequency F2 from interconnection system 820 to receiver system 824.

HVDC interconnection system 820 of FIG. 8 includes a back-to-back DC link 830 situated between bus bars 832 and 834. Bus bar 832 is connected to supply lines 826 and to reactive compensation bus 842. Bus bar 834 is similarly connected to lines 828 and to reactive compensation bus 844.

Each side of back-to-back DC link 830 includes two transformers (e.g., transformers YY and YΔ on the first system side; transformers YY and ΔY on the second system side) and a 12 pulse converter group. As illustrated in FIG. 8, the 12 pulse converter group for the first side of link 830 includes two six pulse converter groups 850 and 852; the 12 pulse converter group for the second side of link 830 includes two six pulse converter groups 860 and 862. As a three phase group is illustrated, each converter group includes six thyristors connected in a manner understood by the man skilled in the art. Smoothing filter 864 is connected between converter groups 850 and 860.

Also shown in FIG. 8 are reactive power supply systems 870 and 880 connected to reactive compensation buses 842 and 844, respectively. Reactive power supply system 870 includes a shunt reactor 871 connected to bus 842 by switch 872, as well as a plurality of filter branches 873A, 873B, 873C connected to bus 842 by switches 874A, 874B, and 874C, respectively. Similarly, reactive power supply system 880 includes a shunt reactor 881 connected to bus 844 by switch 882, as well as a filter branches 883A, 883B, 883C connected to bus 844 by switches 884A, 884B, and 884C, respectively. Although three such filter branches 873A–873C and 883A–883C have been illustrated, it should be understood that a greater number of filter branches may reside in each reactive power supply system 870, 880.

For any given HVDC installation, reactive power supply systems such as systems 870 and 880 are difficult to design and are expensive. Moreover, there are a large number of switched elements that have to be carefully coordinated with a given power level. Various constraints are simultaneously imposed, such as keeping harmonic performance below a requisite level (i.e., harmonic performance index) and yet maintaining reactive power between limits, all the while essentially constantly switching the filters in systems 870 and 880 as power changes. Concerning such restraints, see (for example) Larsen and Miller, "Specification of AC Filters for HVDC Systems", IEEE T&D Conference, New Orleans, April 1989.

Thus, HVDC is complicated due e.g., to the need to closely coordinate harmonic filtering, controls, and reactive compensation. Moreover, HVDC has performance limits when the AC power system on either side has low capacity compared to the HVDC power rating. Further, HVDC undesirably requires significant space, due to the large number of high-voltage switches and filter banks.

Prior art rotary converters utilize a two-step conversion, having both a fully-rated generator and a fully-rated motor on the same shaft. Rotary converters have been utilized to convert power from AC to DC or from DC to AC. However, such rotary converters do not convert directly from AC to AC at differing frequencies. Moreover, rotary converters run continuously at one predetermined speed (at hundreds or thousands of RPMS), acting as motors that actually run themselves. Prior art rotary converters accordingly cannot address the problem of interconnecting two electrical systems that are random walking in their differing frequency distributions.

In a totally different field of technical endeavor, the literature describes a differential "Selsyn"-type drive utilized for speed control of motors. See Puchstein, Llody, and Conrad, *Alternating-Current Machines*, 3rd Edition, John Wiley & Sons, Inc., New York, pp. 425–428, particularly FIG. 275 on page 428, and Kron, *Equivalent Circuits of Electric Machinery*, John Wiley & Sons, Inc., New York, pp. 150–163, particularly FIG. 9.5a on page 156. The literature cites the differential Selsyn drive only in the context of speed control of motors, i.e., motor speed control via relative speed adjustment between a motor and generator. Moreover, the differential Selsyn drive has a low bandwidth and makes no effort to dampen rotor oscillations.

SUMMARY

An electrical interconnection system comprises a rotary transformer and a control system. The control system adjusts an angular position of the rotary transformer so that measured power transferred from a first electrical system to a second electrical system matches an inputted order power. The rotary transformer comprises a rotor assembly and a stator, with the control system adjusting a time integral of rotor speed over time.

The control system includes a first control unit and a second control unit. The first control unit compares the input order power to the measured power to generate a requested angular velocity signal The second control unit compares the requested angular velocity signal to a measured angular velocity signal of the rotary transformer to generate a converter drive signal, thereby controlling the angular positioning of the rotor assembly relative to the stator.

The rotary transformer comprises a rotor connected to the first electrical system and a stator connected to the second electrical system. A torque control unit or actuator rotates the rotor in response to the drive signal generated by the control system.

The bandwidth of the control system is such to dampen oscillations (natural oscillations of the rotor including its reaction to the transmission network into which it is integrated). The bandwidth of the first (slow) control unit is chosen to be below the lowest natural mode of oscillation; the bandwidth of the second (fast) control unit is chosen to be above the highest natural mode of oscillation. As used herein, the bandwidth of a control unit or control system refers to the speed of response of a closed-loop feedback unit or system.

The first and second electrical systems may have a differing electrical characteristic (e.g., frequency or phase). The controller bi-directionally operates the rotary transformer at a variable speed for transferring power from the first electrical system to the second electrical system or vise versa (i.e., from the second electrical system to the first electrical system).

In some embodiments, the torque control unit (actuator) is a motor. In such embodiments, the torque control unit may either directly drive the rotor, or interface with the rotor via a gear. In one particular embodiment, the gear is a worm gear.

In other embodiments, the torque control unit is integrated in the rotor assembly and stator of the rotary transformer. In such embodiments, the function of the torque control unit is accomplished by providing two sets of windings on both the rotor and the stator, a first set of windings on the rotor and stator having a different number of poles (e.g., 2 poles) than a second set of windings on the rotor and stator (e.g., 4 or more poles). The embodiments in which the torque control unit is integrated in the rotor assembly and stator of the rotary transformer include a squirrel cage inductor embodiment; DC-excited rotor (synchronous) embodiment; and, a wound rotor AC embodiment.

The interconnection system of the present system is utilizable in a substation for connecting asynchronous electrical systems, such as first and second power grids having differing electrical frequencies. The interconnection system of the invention not only transfers power, but can also modify power rapidly by accomplishing phase shift under load.

In the present invention, mechanical torque of the rotary transformer is controlled to achieve an ordered power transfer from stator to rotor windings. The present invention contrasts with prior art techniques which controlled power transfer from rotor to stator windings for the purpose of controlling torque applied to the load (and thereby its speed). Moreover, in the present invention, both rotor and stator windings are rated for full power transfer, whereas in prior art applications the rotor winding was rated only for a small fraction of the stator winding.

Importantly, the present invention avoids the prior art HVDC need to closely coordinate harmonic filtering, controls, and reactive compensation. The present invention also advantageously provides a one-step conversion.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
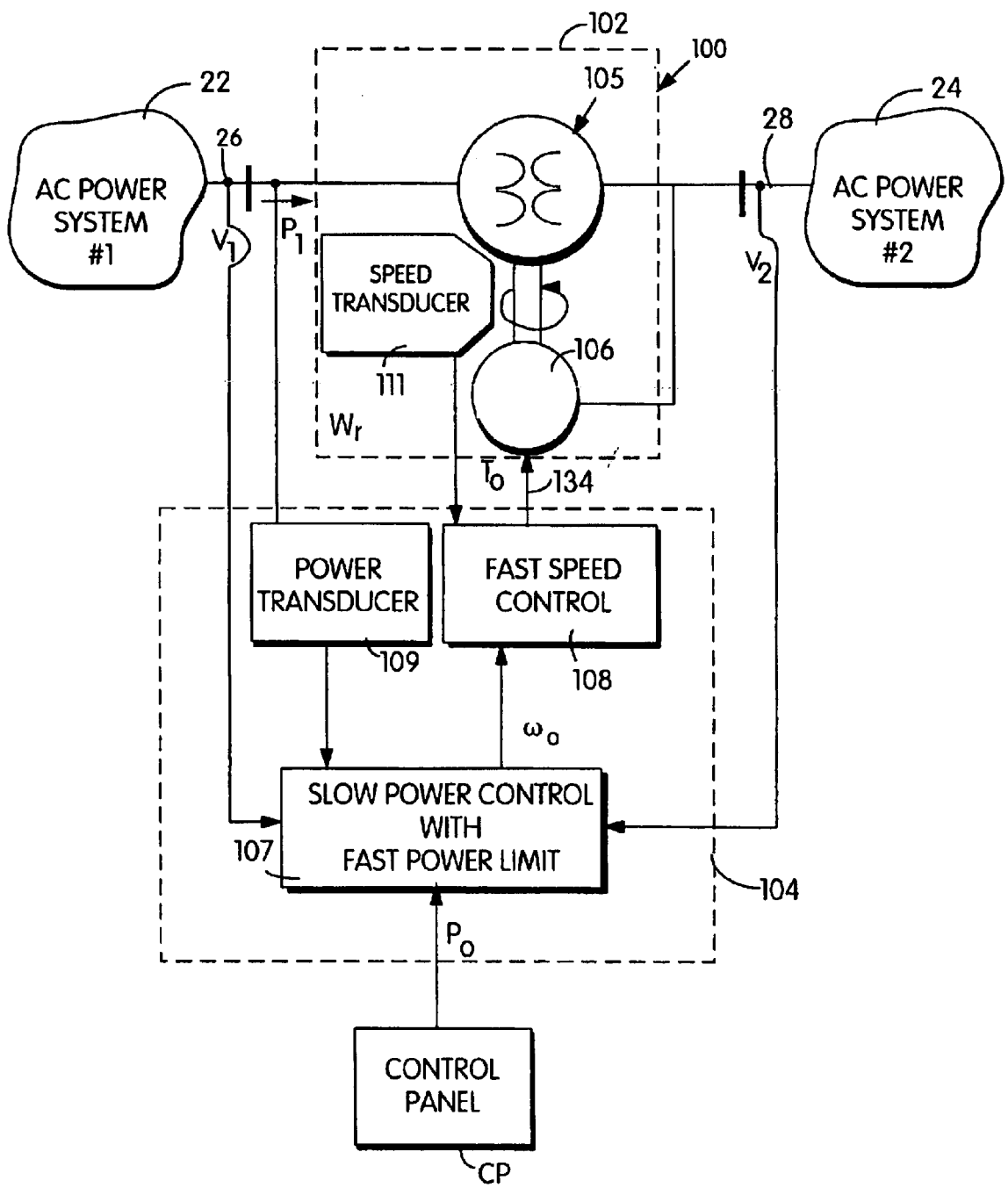
FIG. 1 is schematic view of an electrical power interconnection system according to an embodiment of the invention.

FIG. 1 shows an electrical power interconnection system 100 which includes a variable frequency transformer 102 and a control system 104. As described in more detail below with reference to FIG. 2, variable frequency transformer 102 is connected by 3-phase lines RA, RB, RC (included in line 26) to first AC Power system 22 and by 3-phase lines SA, SB, and SC (included in line 28) to second AC Power System 24. As also explained below, the first electrical system and the second electrical system may have and likely do have a differing electrical characteristic, such as differing electrical frequency.

As shown in FIG. 1, variable frequency rotary transformer 102 includes both a rotary transformer assembly 105 and a torque control unit 106 (also known as the rotor drive section). Details of rotary transformer assembly 105 and torque control unit 106 are below described in more detail in connection with FIG. 2.

As also shown in FIG. 1, control system 104 includes both a slow power control unit 107; a fast speed control unit 108; and a power transducer 109. Slow power control unit 107 is connected to receive the voltage $V_1$ carried on line 26 from first AC Power System 22 and the voltage $V_2$ carried on line 28 to second AC Power System 24, as well as (via power transducer 109) a signal indicative of measured power $P_1$ transmitted on line 26. Slow power control unit 107 is also connected to receive a power order input signal $P_0$ and to output a signal $\omega_0$ to fast speed control unit 108. Fast speed control unit 108 in turn receives a signal $\omega_r$ from speed transducer 111 and outputs a drive signal $T_0$ to torque control unit 106.

Figure 2:
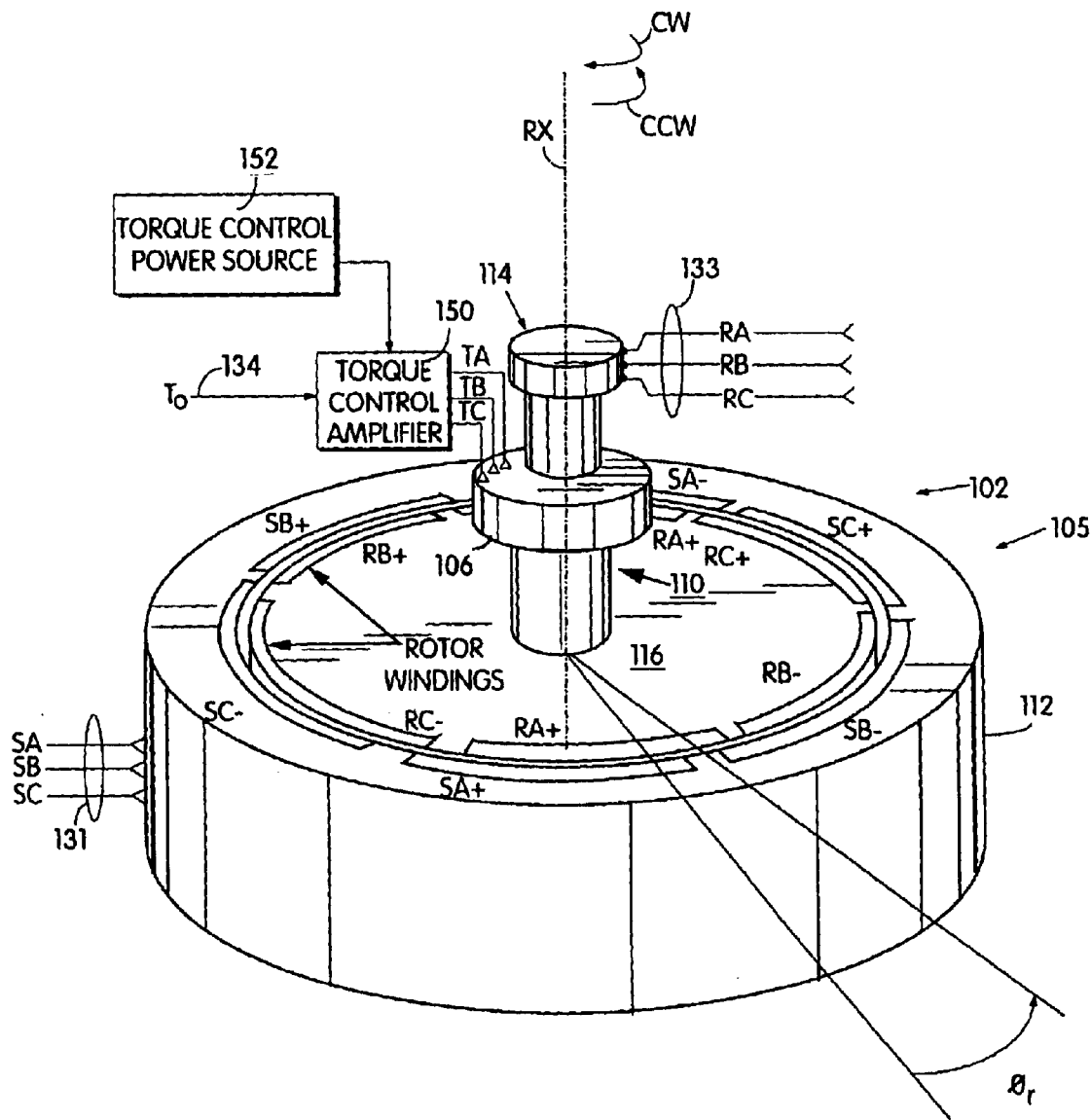
FIG. 2 is a partial schematic, partial perspective view of an electrical power interconnection system according to an embodiment of the invention.

As shown in more detail in FIG. 2, rotary transformer assembly 105 includes both a rotor subassembly 110 and a stator 112. Rotor subassembly 110 includes collector rings 114 (also known as slip rings) and rotor cage section 116. Three-phase lines RA, RB, RC leading from first AC Power System 22 are connected to collector rings 114; three-phase lines SA, SB, and SC leading to second AC Power System 24 are connected to stator 112. Rotor subassembly 110 has speed transducer 111 mounted proximate thereto for generating the angular velocity signal $\omega_r$ indicative of the angular velocity of the rotor.

As shown in FIG. 2 and understood by the man skilled in the art, in the illustrated embodiment rotary transformer assembly 105 is wound with sixty degree phase belts, with rotor windings being labeled as RA+, RC−, RB+, RA−, RC+, and RB− and stator windings labeled as SA+, SC−, SB+, SA−, SC+, and SB−. It should be understood that the invention is not limited to a sixty degree phase belt-wound system, rather the principles of the invention are applicable for rotary transformer assemblies of phase two and greater.

Rotor assembly 110 is rotatable about its axis RX in both clockwise direction CW and counter-clockwise direction CCW. Rotation of rotor assembly 110 is effected by rotor drive section 106.

Figure 3A:
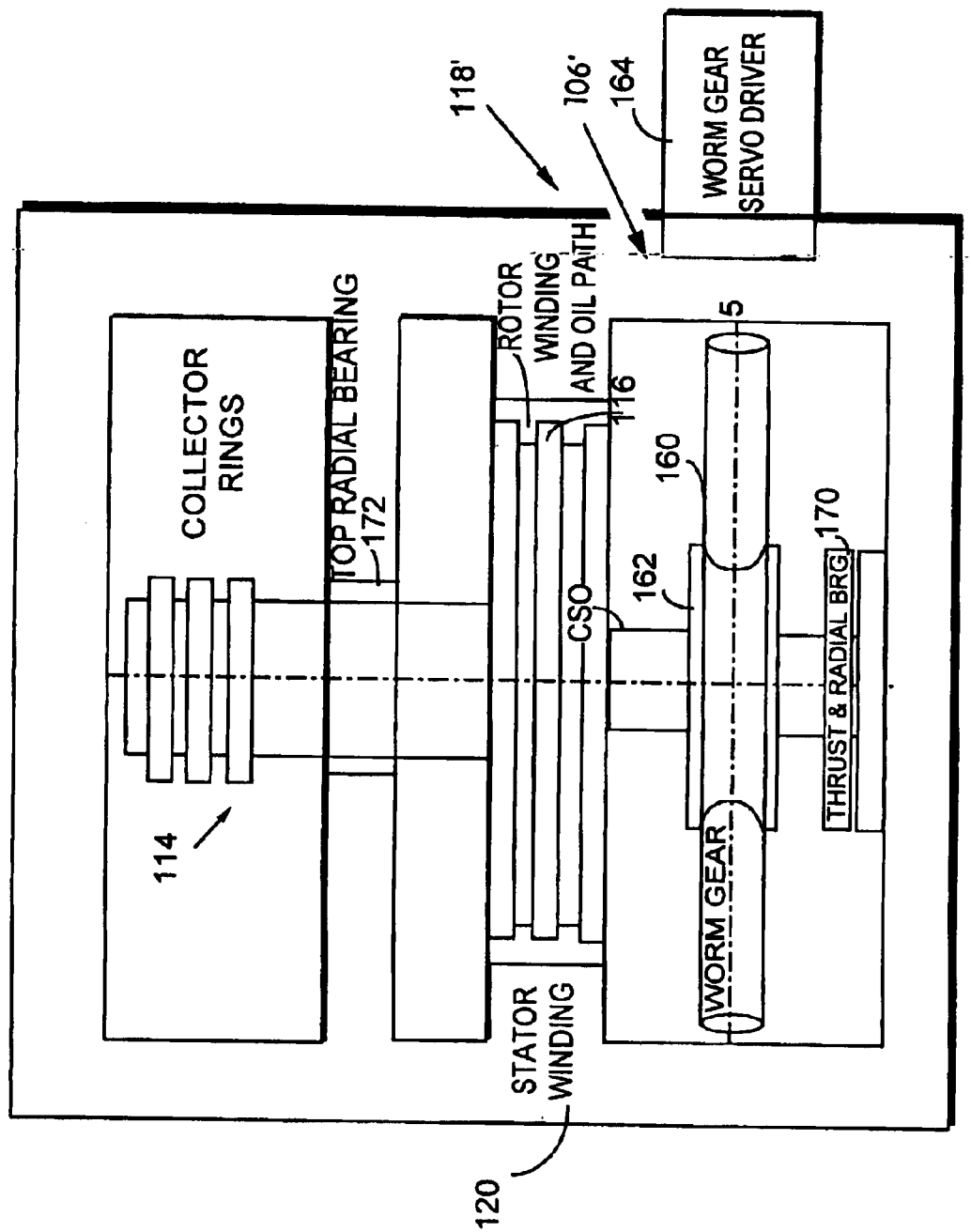
FIG. 3A is a side view of an electrical power interconnection system according to an embodiment of the invention which utilizes a worm gear.
Figure 3B:
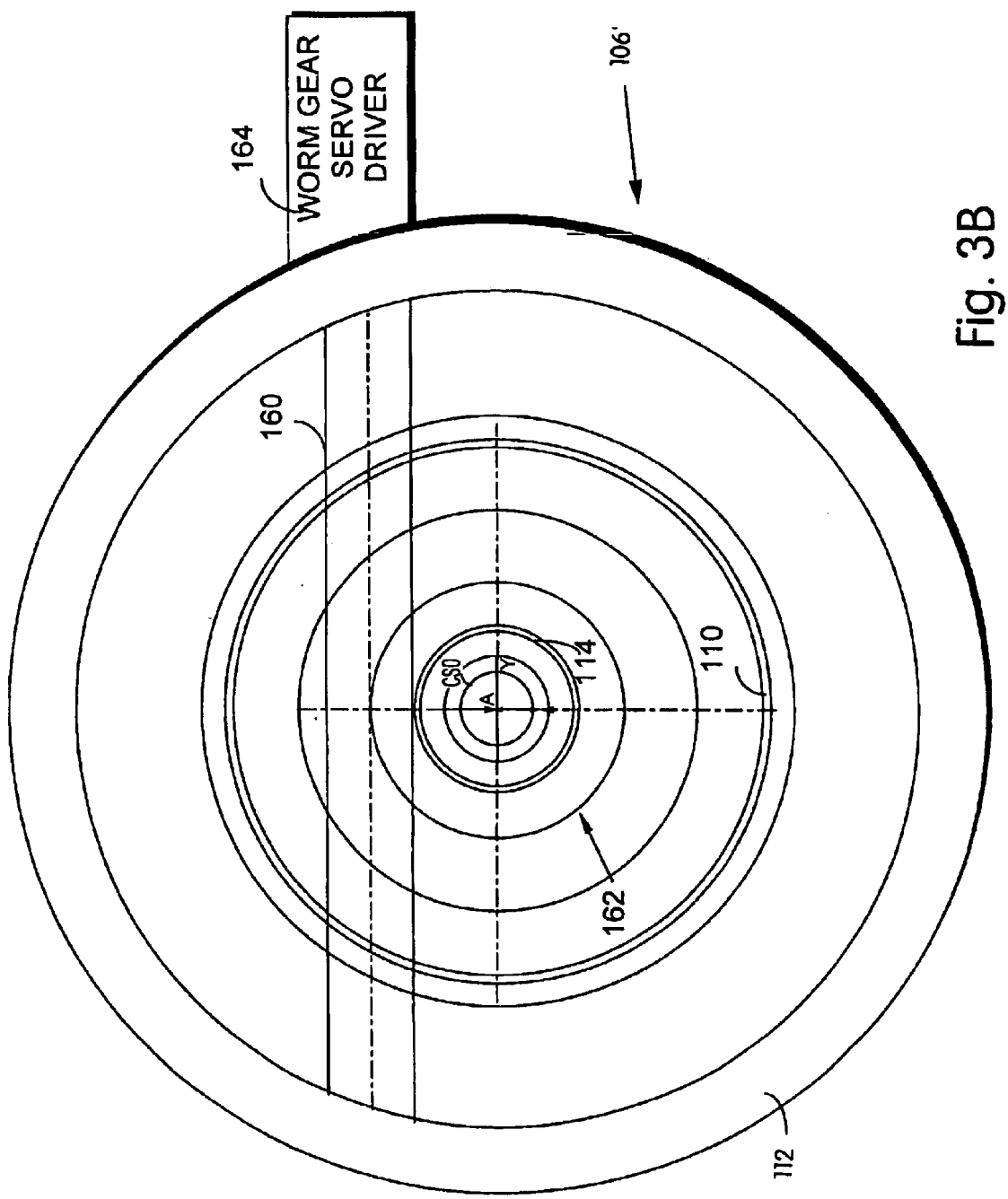
FIG. 3B is top view of the electrical power interconnect system of FIG. 3A.

Rotor drive section 106 is shown symbolically in FIG. 2 as a cylindrical section mounted on rotor assembly 110. Thus, rotor drive section 106 of FIG. 2 generally depicts various alternative and different types of drive mechanisms for causing rotation of rotor assembly 110. In some embodiments, rotor drive section 106 includes an actuator and some type of linkage (e.g., gearing) which interfaces with rotor assembly 110. For example, in one embodiment rotor drive section 106 comprises a worm gear drive arrangement as shown in FIG. 3A and FIG. 3B and discussed hereinafter. In other embodiments, rotor drive section 106 comprises an actuator such as a stepper motor acting through a radial (e.g, spur) gear, a direct drive arrangement, a hydraulic actuator turning a gear on rotor assembly 110, or a pneumatic actuator turning a gear on rotor assembly 110. In yet other embodiments generally illustrated in FIG. 7, the function of the torque control unit (shown as element 106") is accomplished by providing two sets of windings on both the rotor and the stator, a first set of windings on the rotor and stator having a different number of poles (e.g., 2 poles) than a second set of windings on the rotor and stator (e.g., 4 or more poles). Thus, any suitable drive mechanism may be employed for rotor drive section 106 so long as it is compatible with the closed loop angular position of rotor assembly 110 as described herein.

Control system 104 bi-directionally operates the rotor assembly 110 (through rotor drive section 106) for transferring power from first AC Power System 22 to second electrical system 24, or vise-versa. In operation, an operator sets the power order input signal $P_0$ in accordance with a predetermined power transfer requirement prearranged between AC Power Systems 22 and 24. Setting power order input signal $P_0$ can be accomplished by adjusting a knob or inputting data at an operator control panel or operator workstation CP to generate signal $P_0$ indicative of the ordered power. In the particular embodiment illustrated in FIG. 1, control panel CP is remotely located from interconnection system 100.

Slow power control unit 107 compares the power order input signal $P_0$ with the measured power transfer signal $P_1$ in order to produce a requested angular velocity signal $\omega_0$. The measured power transfer signal $P_1$ is obtained from the three lines 26 by power transducer 109. Power transducer 109 can be any one of a number of conventional instruments, with the man skilled in the art readily appreciating how to obtain signal $P_1$.

In the illustrated embodiment, slow power control unit 107 is an integrator which measures a difference between order power signal $P_0$ and measured power signal $P_1$ (i.e., $P_0 - P_1$) and puts the result into an integrator function to generate requested angular velocity signal $\omega_0$. Slow power controller 107 has a very low gain to prevent interference of natural AC system dynamics generally occurring above 3 rad/sec (as described below).

Fast speed controller 108 receives both the requested angular velocity signal $\omega_0$ and a measured angular velocity signal $\omega_r$. The requested angular velocity signal $\omega_0$ is generated by slow speed controller 107 as aforedescribed. The measured angular velocity signal $\omega_r$ is obtained from speed transducer 111. Fast speed controller 108 generates a drive signal (also known as the torque order signal $T_0$) on line 134 so that $\omega_r$ promptly equals $\omega_0$. The man skilled in the art knows how to operate conventional motor drivers as fast speed controller 108 to use signals $\omega_r$ and $\omega_0$ to generate the drive signal $T_0$.

Thus, fast speed controller 108 operates to adjust the drive signal $T_0$ on line 134 to torque control unit 106 such that the actual speed $\omega_r$ of rotor assembly 110 follows the ordered speed $\omega_0$. The closed-loop bandwidth of fast speed controller 108 should exceed the highest natural oscillatory frequency of rotor assembly 110, including its reaction to the transmission network into which it is integrated, and is generally less than 100 rad/sec. Typically, the natural modes of oscillation will range from about 3 rad/sec through 50 rad/sec, and are usually less than 30 rad/sec. In connection with the bandwidth (speed of response) of fast speed controller 108, in the illustrated embodiment, a phase lag from a change in ordered speed $\omega_0$ to actual speed $\omega_r$ of rotor assembly 110 is less than 90 degrees for sinusoidal disturbances. Ensuring this bandwidth of response will in turn ensure that all such natural modes of oscillation will experience beneficial damping from the control system.

The directionality (e.g, polarity) of the drive signal $T_0$ on line 134 is in accordance with the direction of power flow (e.g., in accordance with whether power is flowing from AC Power System 22 to AC Power System 24 or vise-versa). The magnitude of the drive signal $T_0$ on line 134 is used by rotor drive section 106 to increase or decrease the speed of rotor assembly 110 in order to match the difference between the frequencies of AC Power System 22 and AC Power System 24.

As shown in FIG. 2, drive signal $T_0$ on line 134 is applied to torque control amplifier 150. Power is supplied to torque control amplifier 150 by torque control power source 152, whereby using drive signal $T_0$ on line 134 the torque control amplifier 150 outputs the three phase signals TA, TB, and TC to torque control unit 106. As used herein and in this art, TA refers collectively to TA+ and TA−, TB refers collectively to TB+ and TB−, and so forth.

Figure 9:
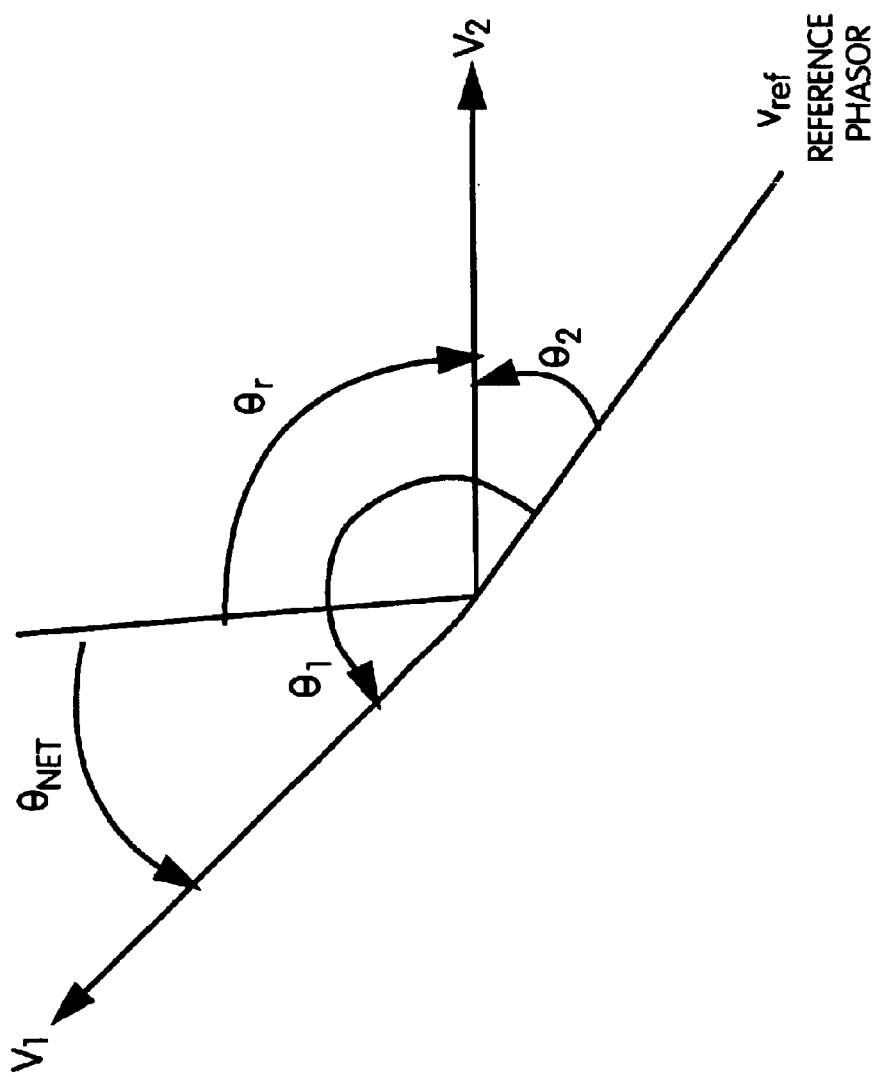
FIG. 9 is a phasor diagram illustrating phasors of the interconnection system of the present invention.

FIG. 9 is a phasor diagram drawn with respect to a reference phasor $V_{ref}$. FIG. 9 shows voltage phasor $V_1$ representing the voltage $V_1$ at AC Power System 22, voltage phasor $V_2$ representing voltage $V_2$ at AC Power System 24, as well as the phase angle $\theta_1$ of ac voltage on lines 26 with reference to phasor $V_{ref}$, the phase angle $\theta_2$ of ac voltage on lines 28 with reference to phasor $V_{ref}$, and $\theta_r$. The angular positioning $\theta_r$ of the rotor assembly 110 relative to the stator 112 is also shown in FIG. 2, it being understood from conventional practice that $\theta_r$ is zero when RA+ lines up exactly with SA+.

An objective of interconnection system 100 is to cause the rotational speed and angular position $\theta_r$ of variable frequency transformer 102 to be such that a desired power (i.e., indicated by order power signal $P_0$) is transferred through interconnect system 100 between AC Power System 22 and AC Power System 24. In essence, interconnect system 100 controls angle $\theta_r$ (see FIG. 9) so that measured power signal $P_1$ matches the order power signal $P_0$. Drive signal $T_0$ on line 134 is used to adjust the angular relationship $\theta_r$ of rotor assembly 110 relative to stator 112, so that the speed and angle of rotary transformer 102 enable transmission of power at the ordered power level.

The power transfer through interconnect system 100 is approximated by Equation 1:

$$P_1 = V_1 V_2 \sin(\theta_1 - \theta_2 + \theta_r)/X_{12} \qquad \text{Equation 1}$$

wherein $P_1$ = power through interconnect system 100;

$V_1$ = voltage magnitude on lines 26

$V_2$ = voltage magnitude on lines 28

$\theta_1$ = phase angle of ac voltage on lines 26 with reference to reference phasor $V_{ref}$ $\theta_2$ = phase angle of ac voltage on lines 28 with reference to reference phasor $V_{ref}$ $\theta_r$ = phase angle of rotor assembly 110 with respect to stator $X_{12}$ = total reactance between lines 26 and 28.

There is a maximum theoretical power transfer possible through interconnect system 100 in either direction. The absolute magnitude of the theoretical power transfer is provided by Equation 2:

$$P_{max} = V_1 V_2/X_{12} \qquad \text{Equation 2}$$

which occurs when the net angle is near 90° in either direction, as understood from Equation 3:

$$\theta_{net} = \theta_1 - \theta_2 + \theta_r = \pm 90° \qquad \text{Equation 3}$$

For stable operation, angle $\theta_{net}$ must have an absolute value significantly less than 90°, which means that power transfer will be limited to some fraction of the maximum theoretical level given by Equation 2. Within this range, the power transfer follows a monotonic and nearly linear relationship to the net angle, which can be approximated by Equation 4:

$$P_1 \cong P_{max} \theta_{net} \qquad \text{Equation 4}$$

The angles of the ac voltage phasors of FIG. 9 are given by the time integrals of their respective frequencies, while the angle of rotor assembly 110 is given by the integral of it speed over time, as demonstrated by Equation 5:

$$P_1 \cong P_{max}[\int (\omega_1(t) - \omega_2(t)) \, dt + \int (\omega_r(t)) \, dt] \qquad \text{Equation 5}$$

where $\omega_1(t)$ = frequency of ac voltage on line 26 as a function of time;

$\omega_2(t)$ = frequency of ac voltage on line 28 as a function of time;

$\omega_r(t)$ = frequency of rotor assembly 110 as a function of time.

Thus, the through power is directly affected by the time-integral of shaft speed of rotor assembly 110 over time. This characteristic permits a power-regulating control loop to be implemented in the present invention by measuring the through power ($P_1$) and adjusting the order for shaft speed ($\omega_0$). By keeping the bandwidth of this power regulator well below that of the lowest oscillatory mode on the system (typically below 3 rad/sec), the objective of damping rotor oscillations will not be compromised.

The fast power-limit function is used to override the normal slow power regulator when the measured power exceeds the limit computed from measured voltages. The limit will be some fraction of the maximum theoretical power as indicated by Equation 6:

$$P_{LIMIT} = F_{LIMIT} P_{max} \qquad \text{Equation 6}$$

wherein $P_{LIMIT}$ = the power limit (applied in either direction);

$F_{LIMIT}$ = the maximum allowed fraction of theoretical power.

As used herein, phase refers to electrical phase. If there are more than two poles, the relationship between mechanical degrees on rotor assembly 110 and electrical degrees is mechanical degrees = 2/#poles * electrical degrees.

Phase shift is accomplished by physically displacing rotor assembly 110 relative to stator 120. The angular position of rotor assembly 110 may be maintained, advanced, or retarded at will. The phase shift is accomplished by changing rotor angular position and thus modifying the mutual inductances among the phases of interconnection system 100.

The number of poles (NP) rotary transformer 105 is typically dependent upon system parameters, such as the number of possible air gaps. However, the number of poles (NP) of the system influences the number of mechanical degrees (NMD) of rotor angular displacement necessary to transfer power for a given electrical frequency differential (EFD), as indicated by the expression NMD=2*EFD/NP. Thus, a high pole number (high NP) can greatly reduce the number of mechanical degrees (NMD) of angular shift required to achieve the electrical shift. For example, a −30 to +30 degree electrical shift is only −2 to +2 degrees of mechanical shift on a 30 pole wound-rotor motor. By reducing the mechanical angle to be shifted, the forces required can be greatly reduced, or conversely the response time greatly increased, to achieve the desired shift.

FIG. 3A and FIG. 3B show electrical power interconnection system 100 having a specific rotor drive section (torque control unit) 106'. Rotor drive section 106' employs worm gear 160 meshing with rotor radial gear 162 as a linkage, and additionally employs worm gear servo driver 164 (e.g., a stepper motor) as an actuator. In addition, FIG. 3A and FIG. 3B show specific mounting structure of rotor assembly 110, particularly thrust and radial bearing 170 and top radial bearing 172 which facilitate both placement and rotation of rotor assembly 110. An advantage of rotor drive section 106' is that the worm gear drive tends to be self-locking. Should its associated servo driver 164 fail to turn, rotor assembly 110 will be locked in position until the electrical phase error reaches 360 degrees. At such time protective relaying will take interconnection system 110 off-line.

As mentioned above, in other embodiments other types of mechanisms are utilized for rotor drive section 106. Whereas rotor drive section 106' of FIG. 3A and FIG. 3B provides a solid connection of rotor assembly 110 to worm gear 160, such solid connection need not necessarily occur for other embodiments. For example, in one embodiment a torsion spring/damper system is inserted between the worm gear 160 and rotor assembly 110 to adjust mechanical dynamics. In such a system, the worm gear-based rotor drive section 106' displaces the phase (for example, 20 electrical degrees), then the combination of electrical energy and mechanical energy is tuned to match the time constants of the load being fed. The result is a uniform power input on the utility side and stabilization of the system load.

Figure 7A:
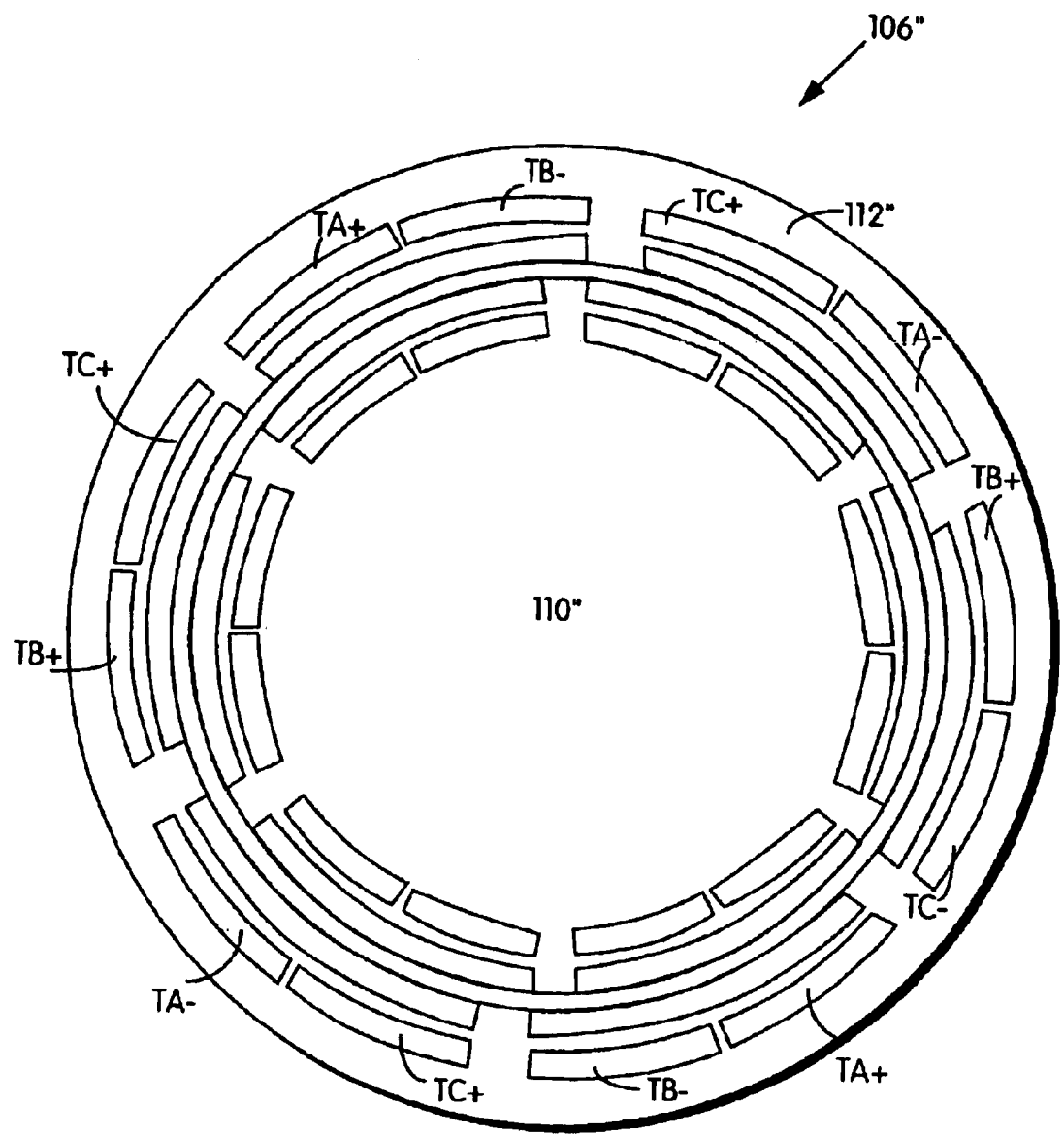
FIG. 7A is a top schematic view of an embodiment wherein a torque control unit is integrated in the rotor assembly and stator of the rotary transformer
Figure 7B:
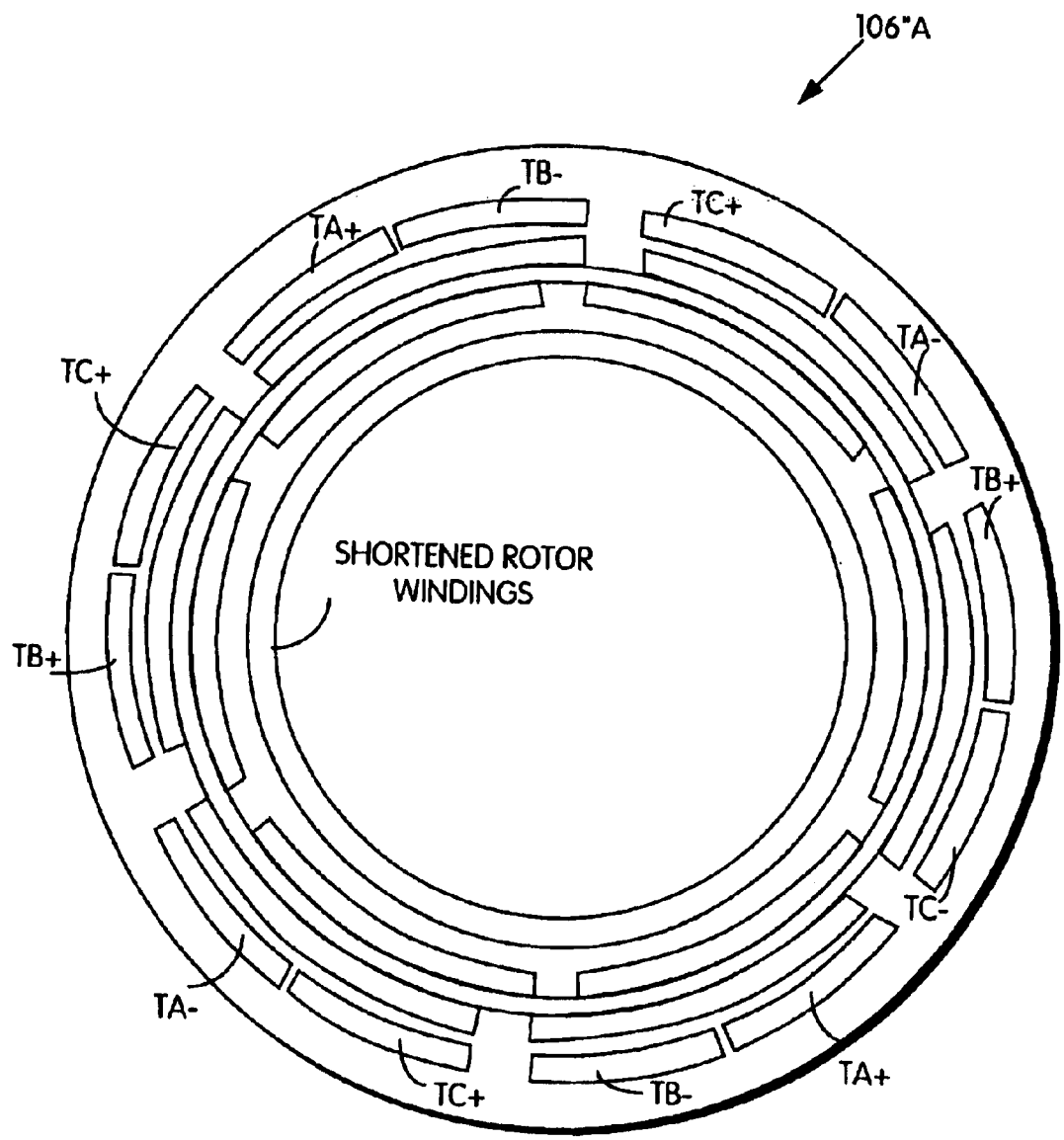
FIG. 7B is a top schematic view of an embodiment wherein a torque control unit is integrated in the rotor assembly and stator of the rotary transformer in a squirrel cage inductor configuration.
Figure 7C:
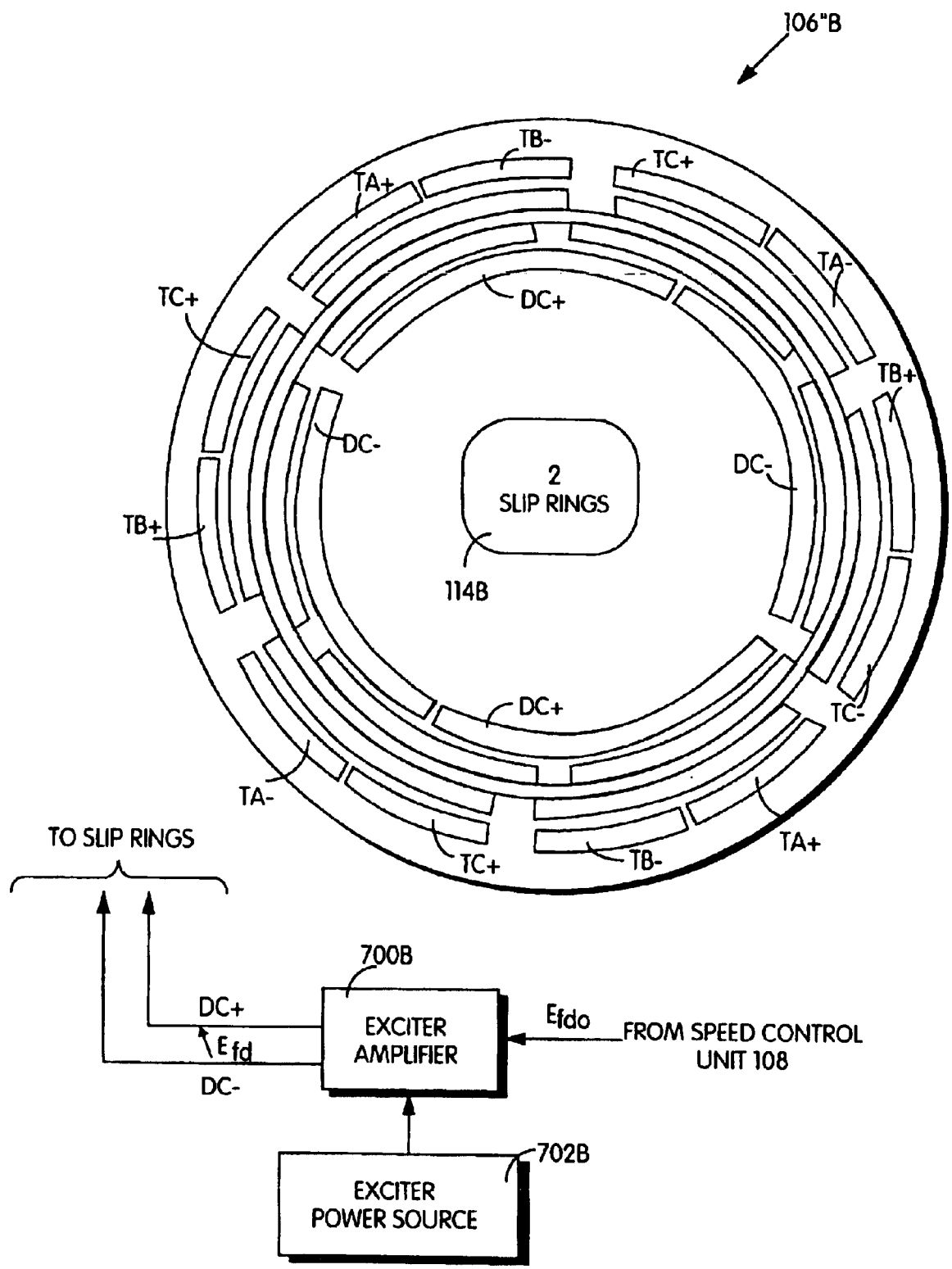
FIG. 7C is a top schematic view of an embodiment wherein a torque control unit is integrated in the rotor assembly and stator of the rotary transformer in a DC-excited rotor (synchronous) configuration.
Figure 7D:
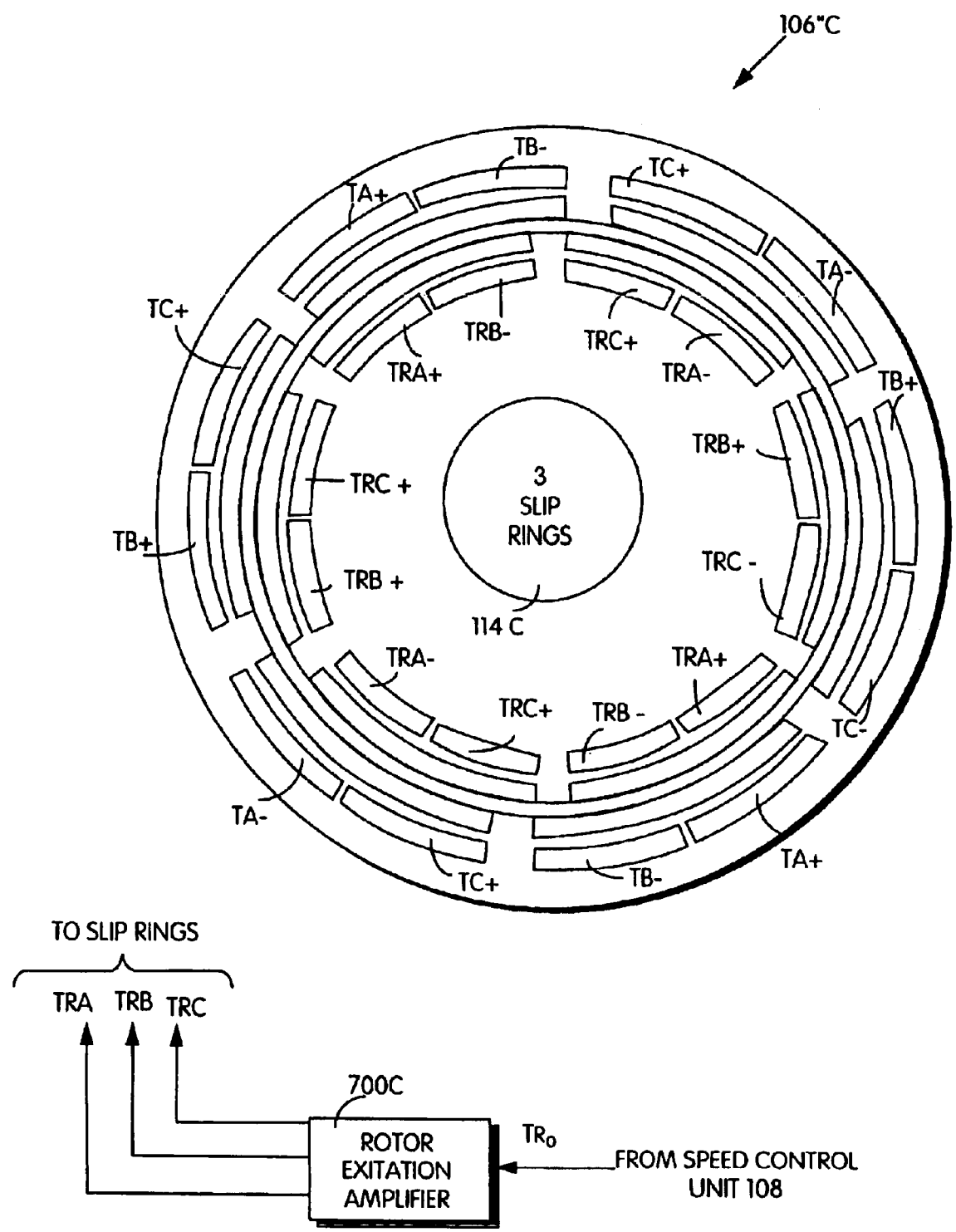
FIG. 7D is a top schematic view of an embodiment wherein a torque control unit is integrated in the rotor assembly and stator of the rotary transformer in a wound rotor AC configuration.
Figure 8:
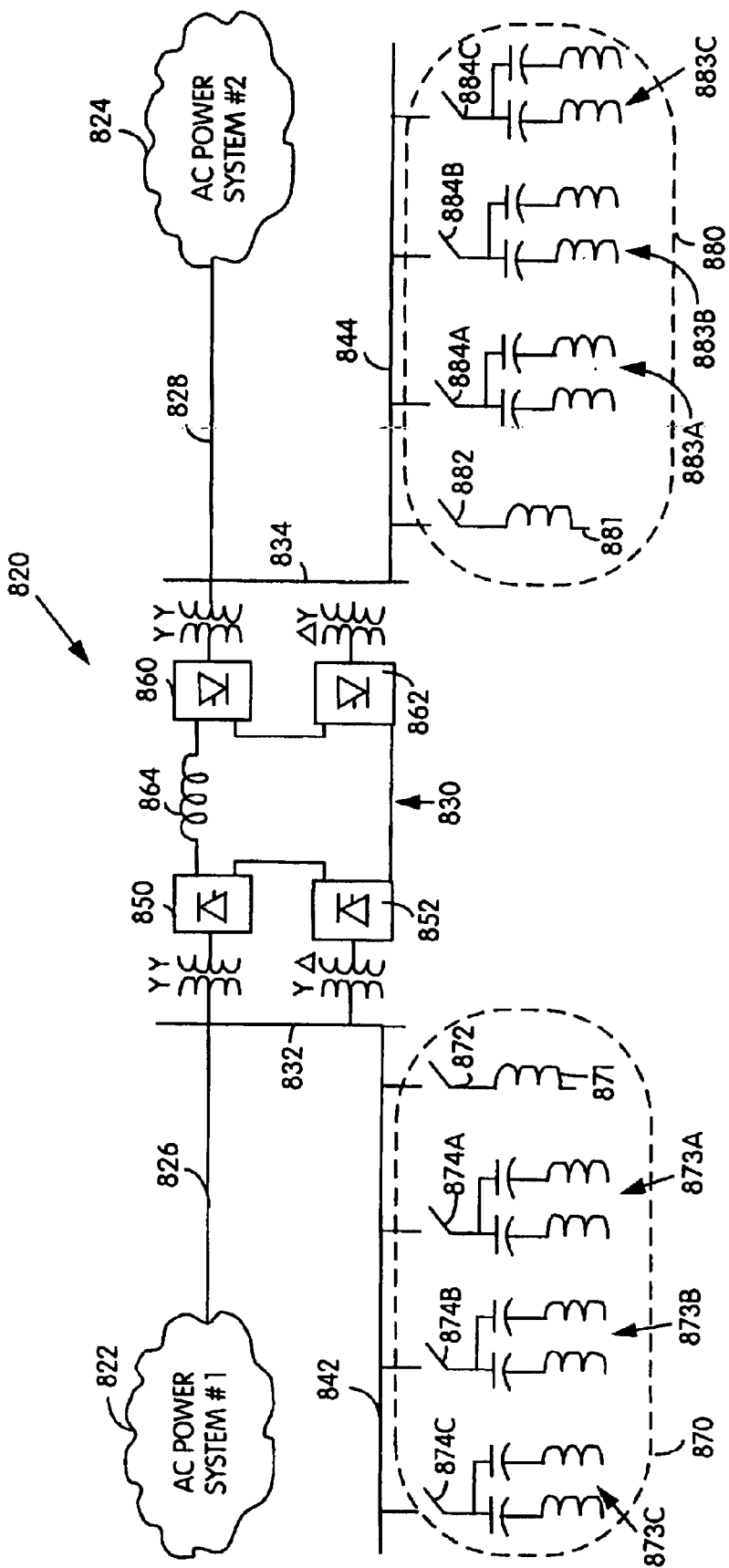
FIG. 8 is a one-line diagram schematically illustrating a prior art HVDC interconnection system.

FIG. 7B, FIG. 7C, and FIG. 7D show specific implementations of rotor drive sections, generally represented by FIG. 7A, which implementations are illustrated as rotor drive sections 106"A, 106"B, and 106"C, respectively. FIG. 7B, FIG. 7C, and FIG. 7D are illustrations of embodiments in which the rotor drive sections are integrated in the rotor assembly 110 kid stator 112 of rotary transformer 110. In particular, FIG. 7B illustrates a squirrel cage inductor embodiment; FIG. 7C illustrates DC-excited rotor (synchronous) embodiment; and, FIG. 7D illustrates a wound rotor AC embodiment.

Referring collectively now to the embodiments of FIG. 7B, FIG. 7C, and FIG. 7D, the rotor drive sections 106"A, 106"B, and 106"C, respectively, all employ a two-pole rotor/stator configuration within a four-pole rotor/stator configuration. In these embodiments, rotor assembly 110" is seen to have, on its outer periphery, the same two-pole rotor windings as shown in FIG. 2 (such common rotor windings being shaded). In addition, rotor assembly 110" has eight four-pole rotor windings (located at a smaller radius from the center of rotor assembly 110" than the two-pole rotor windings, the four-pole rotor windings being unshaded). Stator 112" has, on its inner periphery, the same two-pole stator windings as shown in FIG. 2 (such common stator windings also being shaded). In addition, stator 112" has eight four-pole stator windings (located at a larger radius from the center of rotor assembly 110" than the two-pole stator windings, the four-pole stator windings being unshaded). In the embodiments of FIG. 7B, FIG. 7C, and FIG. 7D, the four-pole stator windings are connected to the lines TA+, TB+, TC+, TA−, TB−, TC− emanating from torque control amplifier 150 (see FIG. 2), and the connections of RA, RB, RC, SA, SB, SC are as shown in FIG. 2.

In the squirrel cage embodiment of FIG. 7A, the four-pole rotor windings are shorted upon themselves to form a squirrel cage induction motor.

In the DC-excited rotor (synchronous) embodiment of FIG. 7C, speed control unit 108 generates a further signal $E_{fdo}$ (field voltage) which is applied to exciter amplifier 7001B. Exciter amplifier 7001B derives its power from exciter power source 702B, and outputs signals DC+ and DC− to a slip ring assembly 114B having two slip rings. Placement of the slip rings in slip ring assembly 114B is understood from collector rings 114 of FIG. 2.

In the wound rotor AC embodiment of FIG. 7D, speed control unit 108 generates a further signal $TR_0$ (rotor current signal) which is applied to rotor excitation amplifier 700C. Rotor excitation amplifier 700C generates the three phase signals TRA, TRB, and TRC which are applied to three slip rings comprising slip ring assembly 114C.

In the embodiments of FIG. 7B, FIG. 7C, and FIG. 7D, the flux in the air gap (between rotor and stator) for the four-pole configuration rotate only half as fast as the flux for the two-pole configuration. As a result, the influence of the four-pole flux upon the two-pole configuration has no average value, but only a "beat" value. In other words, if the flux of the two-pole configuration were rotating at 1 Hz, and the flux of the four-pole configuration were rotating at 0.5 Hz, the two-pole configuration will see a beat frequency of 0.5 Hz.

Although the embodiments of FIG. 7A, FIG. 7B, and FIG. 7C show a two-pole and four-pole configuration, it should be understood that the second configuration could be larger than four poles (e.g, increase the difference of the number of poles of the two configurations), so as to increase the beat frequency between the two configurations to keep pulsations low.

With the embodiments of FIG. 7B, FIG. 7C, and FIG. 7D average torque is controlled using both sets of windings (the two-pole windings and the four-pole windings) independently. For example, as illustrated by the connections in FIG. 7, the four-pole windings could be used to perform the same function of torque control unit 106 (also known as the rotor drive section) of FIG. 2.

Although advantageously avoiding slip rings, the squirrel cage embodiment of FIG. 7A sees average torque from both the "S" windings and from the "T" windings on stator 112. Consequentially, control unit 108 must unscramble these two effects, which the man skilled in the art will readily appreciate and how to resolve.

Figure 4:
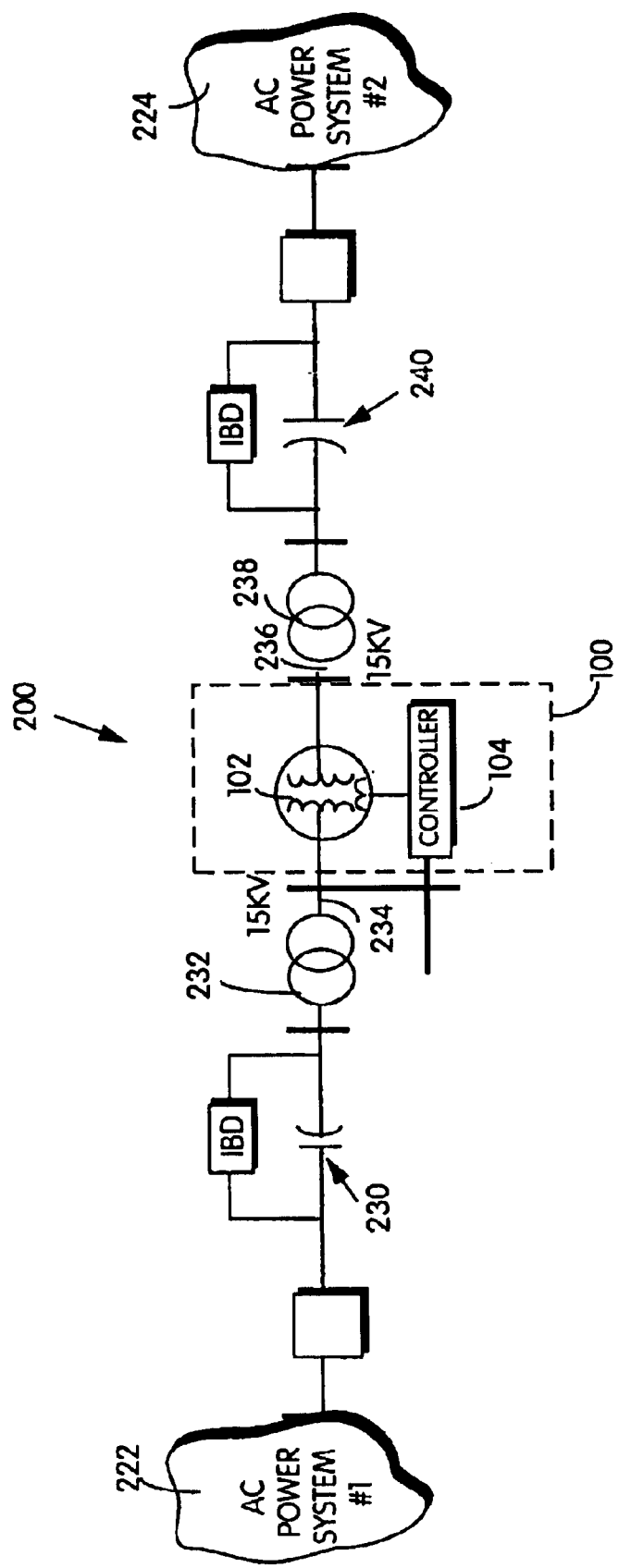
FIG. 4 is a schematic view of a substation for electrical interconnecting a first electrical system and a second electrical system.

FIG. 4 shows incorporation of electrical power interconnection system 100 of the present invention in a substation 200. Substation which electrical interconnects a first electrical system 222 and to a second electrical system 224. It should be understood that first electrical system 222 (labeled as AC Power System #1) and second electrical system 224 (labeled as AC Power System #2) have differing electrical characteristic(s). In the illustration of-FIG. 4, both systems/utilities 222 and 224 happen to operate at 230 kV. It should be understood that other appropriate voltages are employed in other embodiments.

Power supplied by system 222 enters substation 200 of FIG. 4 through series power capacitor 230 (20 Mvar) and is stepped down via 100 MVA generator step-up (GSU) transformer 232 from 230 kV to 15 kV. Stepped-down power from transformer 232 is applied on input line 234 to variable frequency transformer 102 of interconnection system 100. As shown in FIG. 2, input line 234 is actually the three phase lines RA, RB, and RC connected to collector rings 114. An electrical field and power are established on rotor assembly 110, are transferred to stator 112, and transferred from stator 112 on output line 236 at 15 kV. As understood from FIG. 2, output line 236 is actually the three phase lines SA, SB, and SC. Power output from stator 112 on output line 236 is stepped up at 100 MVA generator step-up (GSU) transformer 238 from 15 kV to 230 kV. Stepped-up power from transformer 238 is then applied through series power capacitor 240 (20 Mvar) to system 224.

As understood from the foregoing description of controller 104 in connection with FIG. 2, as included in substation 200 the control system 104 monitors the frequencies of both system 224 and system 222 as those frequencies wander through their differing and respective frequency ranges. As the power flow is monitored, controller 104 generates a drive signal for adjusting the angular position of rotor assembly 110 so that electrical power may be transmitted from system 222 to system 224.

In the above regard, if system 222 were at 59.9 Hz and system 224 were at 60.1 Hz, interconnection system 100 would require a 0.2 Hz change for power transfer from system 222 to system 224. For a 2-pole device, the requisite rotational velocity for rotary transformer 105 would be 120*(0.2)/1=12 revolutions per minute. Given the fact that these frequencies also fluctuate or wander, rotary transformer 105 should typically also be capable of ±0.50 Hz, or a speed range from +30 to −30 revolutions per minute (RPMs) for the 2-pole equivalent.

Figure 5:
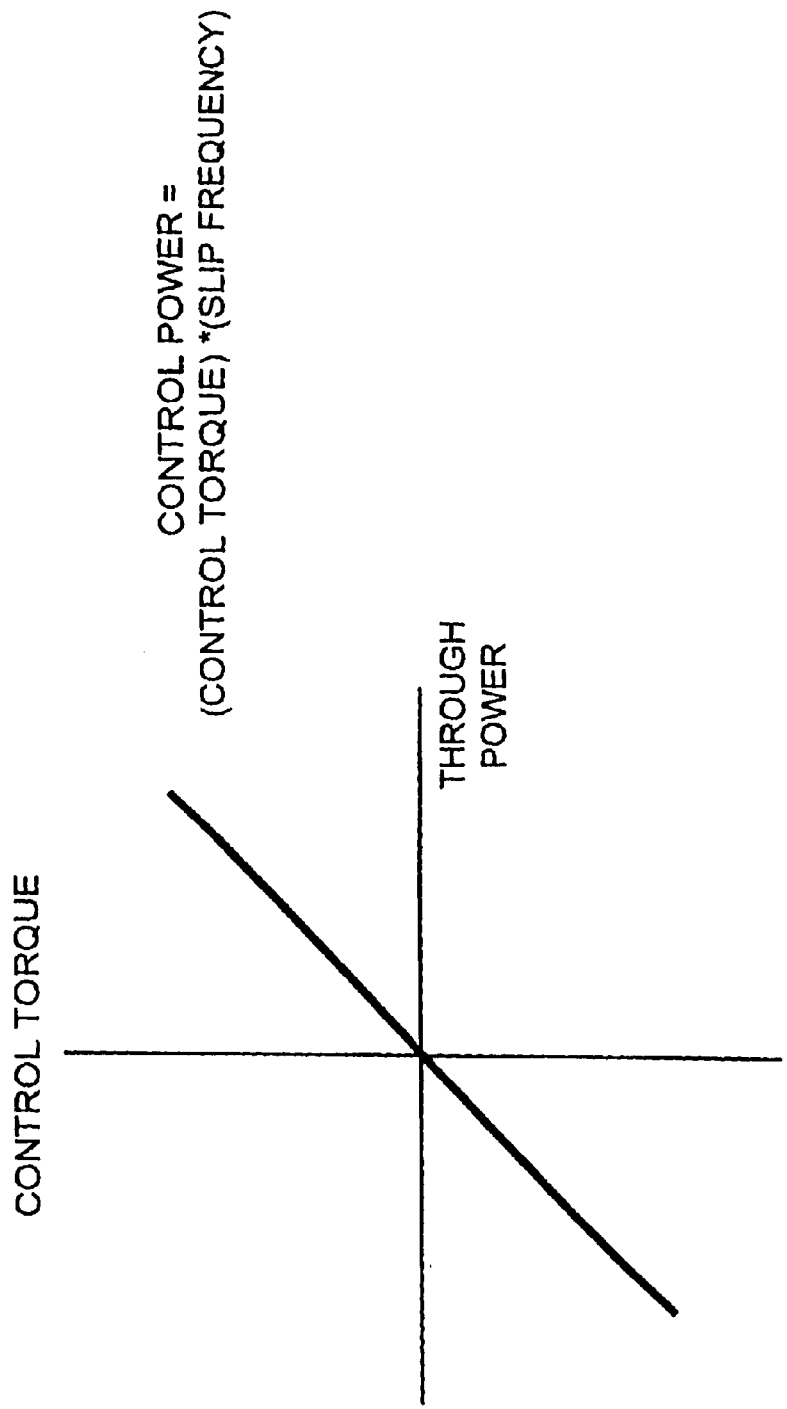
FIG. 5 is a graph showing torque-control requirements of the electrical power interconnection system of the present invention.

FIG. 5 shows the linear relationship between control torque and through power between the first and second electrical systems. For constant power into the machine and constant load power factors, the electromagnetic torque developed is constant. As the slip between the systems increases, the RPM ($\omega_r$) required to match them increases, and the product of the torque and speed is power required by the drive.

Figure 6:
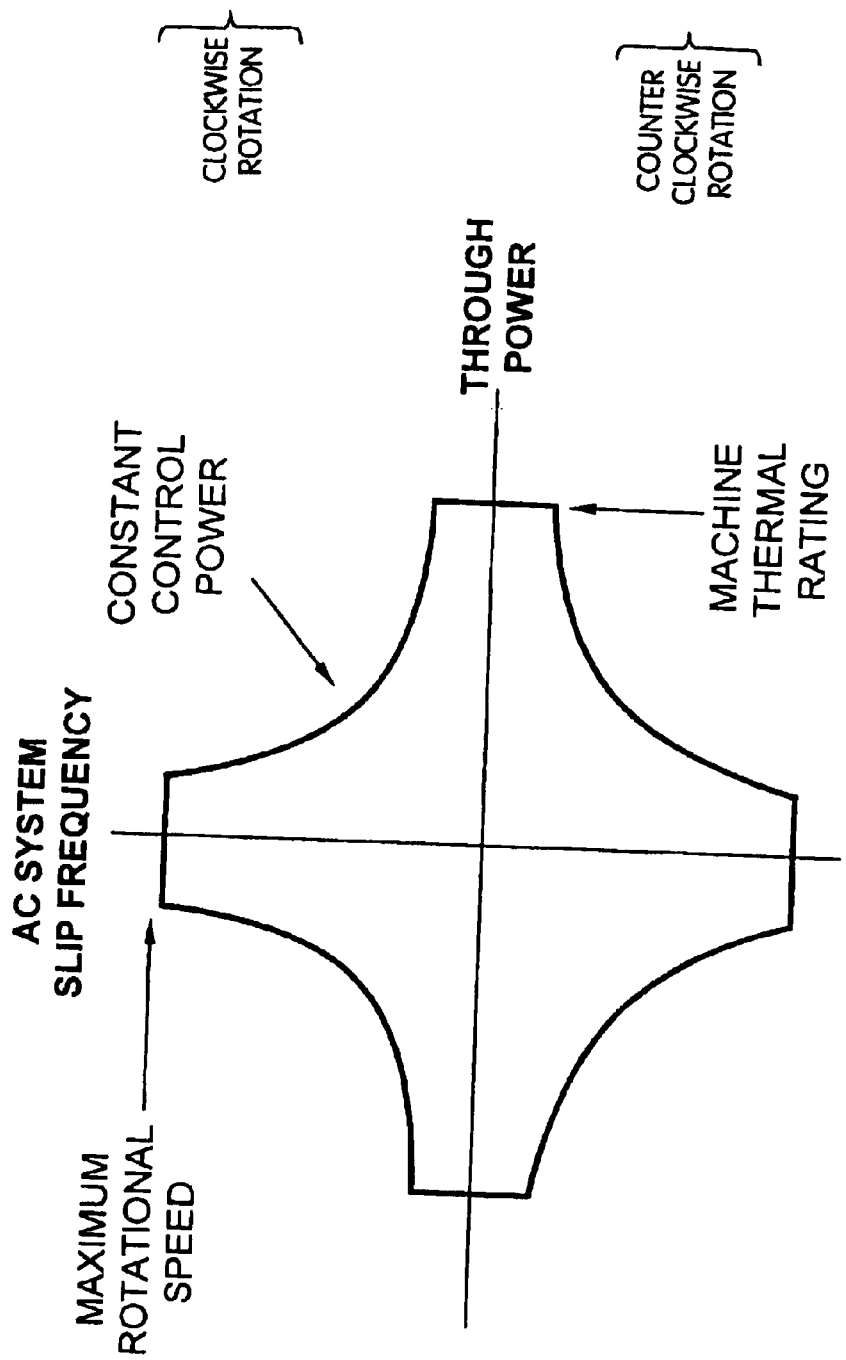
FIG. 6 is a graph showing a capability curve of the electrical power interconnection system of the present invention.

FIG. 6 shows the practical capability curves of the drive system of the present invention. The relationship between control torque and through power was shown in FIG. 5. "Through Power" is a machine thermal rating if maximum torque is provided by an electromechanical drive (e.g., a maximum thrust rating for worm gear bearing). "Through Power" is essentially material-limited, whether insulation class for a winding or a material stress allowable, respectively.

In the present invention, mechanical torque of the rotary transformer is controlled to achieve an ordered power transfer from stator to rotor windings. The present invention contrasts with prior art techniques which controlled power transfer from rotor to stator windings for the purpose of controlling torque applied to the load (and thereby its speed). Moreover, in the present invention, both rotor and stator windings are rated for full power transfer, whereas in prior art applications the rotor winding was rated only for a small fraction of the stator winding.

Importantly, the present invention avoids the prior art HVDC need to closely coordinate harmonic filtering, controls, and reactive compensation. The present invention also advantageously provides a one-step conversion.

Advantageously, interconnection system 100 of the present invention performs continuous phase shifting by controlling rotor angle $\theta_r$ (i.e., the angular position of rotor assembly 110). Interconnection system 100 permits continuous adjustment of electrical phase by virtue of its potential 360 degree rotation, making the system a very low frequency synchronous converter. Moreover, interconnection system 100 can be repetitively displaced through large angular displacements to accomplish very large electrical phase shifts in a rapidly changing power condition on a large system.

Thus, unlike conventional rotary converters, rotor assembly 110 is not rotated at a constant angular velocity, but instead is rotated at a continuously variable angular velocity as required by control system 104. Moreover, bi-directional angular velocity is achieved as rotor assembly 110 is rotatable in both clockwise direction CW and counter-clockwise direction CCW as shown in FIG. 2.

Whereas typical synchronous converters run at constant, uni-directional angular velocity of hundreds or thousands of RPMs, rotary transformer 105 of interconnection system 100 typically runs, forward or backward, at less than 50 RPM.

Interconnection system 100 provides accurate and reliable phase shift control, with the ability to follow frequency drift and control phase in all four quadrants of control. Thus, interconnection system 100 not only transfers power, but can also modify power rapidly by accomplishing phase shift under load.

Although described above for its interconnect function, interconnection system 100 can also serve as an energy storage system. Interconnection system 100 can be used to store energy by rotational inertia, to average large pulsating loads, similar to those present in arc melters for steel processing.

While the invention has been particularly shown and described with reference to the preferred embodiments thereof, it will be understood by those skilled in the art that various alterations in form and detail may be made therein without departing from the spirit and scope of the invention. For example, whereas in the foregoing description a supply electrical system has been illustrated as being connected to collector rings 114 and a receiver electrical system has been illustrated as being connected to stator 112, it should be understood that these illustrated connections can be reversed.

The embodiments of the invention in which an exclusive property or privilege is claimed are defined as follows:

1. An electrical interconnection system comprising:
   a rotary transformer for coupling to a first electrical system and to a second electrical system, the rotary transformer comprising:
      a rotor connected to the first electrical system;
      a stator connected to the second electrical system;
   a controller which adjusts an angular position of the rotary transformer, the controller comprising:
      a first control unit which compares an input order power signal $P_0$ to a measured power signal $P_1$ being transferred between the first electrical system and the second electrical system to generate a requested angular velocity signal $\omega_0$;
      a second control unit which compares the requested angular velocity signal $\omega_0$ to a measured angular velocity signal $\omega_r$ of the rotary transformer to generate a drive signal $T_0$.

2. The system of claim 1, wherein the controller adjusts an angular position of the rotary transformer so that a predetermined power is transferred from the first electrical system to the second electrical system.

3. The system of claim 1, wherein the controller has a bandwidth chosen to dampen inherent oscillations in the interconnection system.

4. The system of claim 1, wherein the first electrical system and the second electrical system are a respective first electrical utility company and a second electric utility company.

5. The system of claim 1, wherein the interconnection system further comprises a torque control unit for rotating the rotor.

6. The system of claim 5, wherein the controller controls the torque control unit whereby the rotor is rotated at a variable speed.

7. The system of claim 6, wherein the controller controls the torque control unit whereby the rotor is bi-directionally rotated at a variable speed.

8. A substation for electrically interconnecting a first electrical system and to a second electrical system, the first electrical system and the second electrical system having a differing electrical characteristic, the substation comprising:
- a step-down transformer coupled to the first electrical system;
- a step-up transformer coupled to the second electrical system;
- a rotary transformer coupled to the step-down transformer and to the step-up transformer, the rotary transformer comprising:
  - a rotor connected to a first of the step-down and step-up transformers;
  - a stator connected to a second of the step-down and step-up transformers;
- a controller which adjusts an angular position of the rotary transformer so that a predetermined power is transferred from the first electrical system to the second electrical system, the controller comprising:
  - a first control unit which compares an input order power signal $P_0$ to a measured power signal $P_1$ being transferred between the first electrical system and the second electrical system to generate a requested angular velocity signal $\omega_0$;
  - a second control unit which compares the requested angular velocity signal $\omega_0$ to a measured angular velocity signal $\omega_r$ of the rotary transformer to generate a drive signal $T_0$.

9. The system of claim 8, wherein the controller bi-directionally operates the rotary transformer at a variable speed for transferring power from the first electrical system to the second electrical system.

10. The system of claim 8, wherein the rotary transformer comprises:
- a rotor connected to a first of the step-down and step-up transformers;
- a stator connected to a second of the step-down and step-up transformers;
- and wherein the interconnection system further comprises an torque control unit for rotating the rotor.

11. The system of claim 10, wherein the controller controls the torque control unit whereby the rotor is rotated at a variable speed.

12. The system of claim 8, wherein the controller has a bandwidth chosen to dampen inherent oscillations in the interconnection system.

13. An electrical interconnection system comprising:
- a rotary transformer for coupling to a first electrical system and to a second electrical system, the rotary transformer comprising:
  - a rotor connected to the first electrical system;
  - a stator connected to the second electrical system;
- a closed loop angular positioning control system which operates the rotary transformer for transferring power from the first electrical system to the second electrical system in response to a comparison between an input order power signal $P_0$ and a measured power signal $P_1$ being transferred between the first electrical system and the second electrical system.

14. A method of interconnecting two electrical systems, the method comprising:
- coupling a rotor of a rotary transformer to a first electrical system and a stator of the rotary transformer to a second electrical system;
- comparing an input order power signal $P_0$ and a measured power signal $P_1$ being transferred between the first electrical system and the second electrical system to generate a requested angular velocity signal $\omega_0$; and
- adjusting an angular position of the rotary transformer so that a predetermined power is transferred from the first electrical system to the second electrical system, the adjusting being performed by a closed loop angular positioning control system which operates the rotary transformer for transferring power from the first electrical system to the second electrical system.

15. The method of claim 14, further comprising:
- comparing the requested angular velocity signal $\omega_0$ to a measured angular velocity signal $\omega_r$ of the rotary transformer to generate a drive signal $T_0$.

* * * * *

UNITED STATES PATENT AND TRADEMARK OFFICE
CERTIFICATE OF CORRECTION

PATENT NO. : 6,741,485 B1
DATED : May 25, 2004
INVENTOR(S) : Runkle et al.

It is certified that error appears in the above-identified patent and that said Letters Patent is hereby corrected as shown below:

Column 2,
Line 55, delete "RPMS" and insert -- RPMs --.

Column 9,
Line 49, delete "110 kid stator 112" and insert -- 110 and stator 112 --.

Column 10,
Line 9, delete "FIG. 7A" and insert -- FIG. 7B --.
Line 15, delete "7001B" and insert -- 700B --.

Signed and Sealed this

Sixteenth Day of November, 2004

JON W. DUDAS
*Director of the United States Patent and Trademark Office*